United States Patent
Irie (10) Patent No.: US 8,023,012 B2
(45) Date of Patent: Sep. 20, 2011

(54) IMAGE CAPTURE DEVICE CORRECTING DEFECTIVE PIXEL INFORMATION

(75) Inventor: Kousuke Irie, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 1481 days.

(21) Appl. No.: 11/206,196

(22) Filed: Aug. 18, 2005

(65) Prior Publication Data

US 2006/0050158 A1 Mar. 9, 2006

(30) Foreign Application Priority Data

Aug. 23, 2004 (JP) ................. 2004-242288

(51) Int. Cl.
H04N 5/76 (2006.01)
H04N 9/64 (2006.01)

(52) U.S. Cl. ............... 348/247; 348/231.9; 348/246

(58) Field of Classification Search ........... 348/220.1, 348/246, 247
See application file for complete search history.

(56) References Cited

U.S. PATENT DOCUMENTS

| | | | | |
|---|---|---|---|---|
| 6,819,358 B1 * | 11/2004 | Kagle et al. | ........ | 348/246 |
| 6,961,085 B2 * | 11/2005 | Sasaki | ........ | 348/222.1 |
| 6,970,193 B1 * | 11/2005 | Kidono et al. | ........ | 348/245 |
| 7,098,939 B2 * | 8/2006 | Hamamura et al. | ........ | 348/51 |
| 7,206,020 B2 * | 4/2007 | Kato | ........ | 348/247 |
| 7,307,659 B2 * | 12/2007 | Gorder et al. | ........ | 348/241 |
| 2004/0169737 A1 * | 9/2004 | Udagawa | ........ | 348/222.1 |
| 2008/0231734 A1 * | 9/2008 | Enomoto | ........ | 348/246 |

FOREIGN PATENT DOCUMENTS

| | | |
|---|---|---|
| JP | 06-028246 A | 2/1994 |
| JP | 08-249041 A | 9/1996 |
| JP | 11-112879 A | 4/1999 |
| JP | A 2000-101925 | 4/2000 |
| JP | 2002-152601 A | 5/2002 |
| JP | 2004-129117 A | 4/2004 |

OTHER PUBLICATIONS

Corresponding JPO Official Communication.

* cited by examiner

Primary Examiner — David L. Ometz
Assistant Examiner — Carramah J Quiett
(74) Attorney, Agent, or Firm — Sheldon J. Moss; Chad M. Herring (57) ABSTRACT

An image capture device provided with a first memory unit, which memorizes position information of non-continuous defective pixels of a solid-state image capture component, and a second memory unit with a higher access rate than the first memory unit, which memorizes position information of continuous defective pixels. When a continuous photography mode or a video photography mode is set, defective pixel correction processing is carried out on image data corresponding to each of defective pixels according to the defective pixel position information stored at the second memory unit. Alternatively, when a still photography mode is set, image data corresponding to all defective pixels is corrected, based on both the defective pixel position information stored at the first memory unit and the defective pixel position information stored at the second memory unit. As a result, it is possible to correct defective pixels with high efficiency in accordance with conditions of photography.

9 Claims, 5 Drawing Sheets

IMAGE CAPTURE DEVICE CORRECTING DEFECTIVE PIXEL INFORMATION

CROSS-REFERENCE TO RELATED APPLICATION

This application claims priority under 35 USC 119 from Japanese Patent Application No. 2004-242288, the disclosure of which is incorporated by reference herein.

BACKGROUND OF THE INVENTION

1. Field of the Invention

The present invention relates to an image capture device and an image data correction process at the image capture device, and more particularly to an image capture device such as a digital camera or the like.

2. Description of the Related Art

Conventionally, solid-state image capture components of digital cameras, which serve as image capture devices, convert light corresponding to subjects to electronic signals by photoelectric conversion with pluralities of photoelectric conversion elements, and output the electronic signals. Among such photoelectric conversion elements, there may be defects (defective pixels) due to adhesion of dust, damage and the like, and due to crystal defects and the like. Hence, it may not be possible to output signals which accurately correspond to light amounts of incident light with these defective pixels. Among such defective pixels, a defective pixel which is caused by dust, damage or the like is a defective pixel with a static characteristic, which is not affected by conditions of operation of the image capture device. On the other hand, a defective pixel which arises due to a crystal defect is a defective pixel with a dynamic characteristic, in which there is a greater effect of deterioration in image quality when a duration of exposure of the solid-state image capture component is longer.

Techniques for performing corrections of image data that corresponds to these various types of defective pixels have been known (for example, Japanese Patent Application Laid-Open (JP-A) No. 2000-101925).

In the technique disclosed in JP-A No. 2000-101925, in accordance with conditions of photography, such as shutter speed, ambient temperature and so forth, position information representing each of positions of defective pixels caused by dust, damage and the like and positions of defective pixels caused by crystal defects is memorized in a lookup table for a plurality of values of each of the conditions of photography. Hence, position information of defective pixels is selected from the lookup table in accordance with an ambient temperature and shutter speed or the like at a time of photography, and correction of the defective pixels is carried out in accordance with the thus-specified position information.

However, although it is possible to perform correction for defective pixels in accordance with conditions of photography with the conventional technique described above, when image data corresponding to the defective pixels is to be corrected, it is necessary to select the position information of the defective pixels corresponding to the conditions of photography from among a large amount of pre-memorized position information representing defective pixel positions. Therefore, when photography conditions which require high-speed image processing are specified, an amount of time for reading the information relating to defective pixels may be a problem.

SUMMARY OF THE INVENTION

The present invention has been devised in order to solve the problem described above, and an object of the present invention is to provide an image capture device which carries out correction of defective pixels with high efficiency in accordance with conditions of photography.

A first aspect of the present invention for achieving the object described above is an image capture device including: an image capture unit including a solid-state image capture component, which is equipped with a plurality of photoelectric conversion elements for photoelectrically converting light in accordance with a subject, the image capture unit providing image data of a photographic image of the subject with the solid-state image capture component; a first memory unit, which memorizes position information of each of non-contiguous defective pixels at the solid-state image capture component; a second memory unit, with a higher access rate than the first memory unit, which memorizes position information of each of contiguous defective pixels at the solid-state image capture component; a mode setting unit, at which mode information representing a photography mode is set; and a correction unit which corrects the image data, wherein, when the mode information set at the mode setting unit represents one of a continuous photography mode for providing image data of a series of photographic images and a video photography mode for providing image data of a moving image, the correction unit corrects, of the image data provided by the image capture unit, image data that corresponds to defective pixels according to the position information memorized at the second memory unit, and when the mode information set at the mode setting unit represents a still photography mode for providing image data of a still image, the correction unit corrects, of the image data provided by the image capture unit, image data that corresponds to defective pixels according to the position information memorized at the second memory unit and the position information memorized at the first memory unit.

The image capture unit of the image capture device of the first aspect obtains image data of a photographic image with the solid-state image capture component, which is provided with the plurality of photoelectric conversion elements for photoelectric conversion of light according to a subject. The first memory unit memorizes position information of each of defective pixels which do not output image data accurately corresponding to light amounts of incident light, which information is generated for positions which are non-continuous, which is to say scattered, at the solid-state image capture component. The second memory unit is a high-speed memory, which has a higher rate of access to memorized information than the first memory unit. The second memory unit memorizes position information of each of defective pixels which are continuous at the solid-state image capture component. The mode setting unit acquires mode information representing a photography mode. When the mode information acquired by the mode setting unit is mode information representing the continuous photography mode, for obtaining image data of a series of photographic images, or the video photography mode, for obtaining image data of moving images, the correction unit corrects, of the image data obtained by the image capture unit, image data corresponding to the position information of each of the contiguous defective pixels that has been memorized by the second memory unit, which is the high-speed memory. When the mode information acquired by the mode setting unit represents the still photography mode, for obtaining image data of still images, the correction unit corrects, of the image data acquired by the image capture unit, image data corresponding to the position information of each of the non-contiguous defect pixels that has been memorized by the first memory unit, which is a lower-speed memory than the second memory unit, and the position information memorized by the second memory unit.

Thus, when mode information is acquired which represents the continuous photography mode or the video photography mode, which require processing of image data at higher speeds than for acquisition of image data of photographic images by the still photography mode which provides image data of still images, the image data is corrected in accordance with position information of continuous defective pixels, which more greatly affect image quality, which information is memorized at the second memory unit, which is the high-speed memory. When mode information is acquired which represents the still photography mode, which requires acquisition of image data with higher image quality, the image data is corrected in accordance with the position information of all defective pixels at the solid-state image capture component, which information is memorized at the two memory units, the first memory unit and the second memory unit.

As a result, it is possible to perform corrections of defective pixels with high efficiency in accordance with photography conditions, without durations of reading of information relating to defective pixels having any effect.

In the image capture device of the first aspect, the first memory unit compresses and stores the position information of defective pixels. When the mode information set at the mode setting unit is mode information which represents the still photography mode, which provides image data of still images, the correction unit corrects, of the image data provided by the image capture unit, image data which corresponds to defective pixels according to the position information memorized at the second memory unit and position information which is decompressed from the compressed position information of defective pixels, which has been memorized at the first memory unit.

The first memory unit can compress and memorize the position information of non-continuous defective pixels of the solid-state image capture unit. When the mode information set at the mode setting unit is mode information representing the still photography mode for obtaining image data of still images, the correction unit corrects image data that corresponds to defective pixels according to both the position information which is decompressed from the compressed position information memorized at the first memory unit and the non-compressed position information which is memorized at the second memory unit. Accordingly, because the position information of the non-continuous defective pixels of the solid-state image capture component stored at the second memory unit is compressed for memorization, memory capacity of the second memory unit can be assured. Further, the decompression of the compressed position information is carried out only when mode information is acquired which represents the still photography mode for obtaining image data of still images, with which the need for rapid processing is lower than with image data obtained by the continuous photography mode or the video photography mode. Thus, it is possible to prevent reductions in processing speeds in the image capture device due to decompression processing.

The correction unit can correct image data that corresponds to defective pixels by interpolating image data that corresponds to the defective pixels from image data of pixels around the defective pixels.

The correction unit can perform correction by interpolating the image data corresponding to the defective pixels of the solid-state image capture unit from image data corresponding to pixels circumferential to the defective pixels, from which signals which accurately correspond to light amounts of incident light can be outputted.

As illustrated hereabove, when mode information is acquired which represents the continuous photography mode or the video photography mode, for which higher speeds of processing of image data are required than for the still photography mode, image data corresponding to the position information of defective pixels which are continuous, which is stored in the second memory which is a high-speed memory, is corrected. When mode information is acquired which represents the still photography mode, which requires acquisition of image data at higher image quality than in the video photography mode and the continuous photography mode, image data corresponding to position information of all the defective pixels of the solid-state image capture component, which is memorized in both the first memory unit and the second memory unit, is corrected. Thus, benefits are provided in that it is possible to restrain durations for acquisition of information relating to defective pixels from becoming a problem, and it is possible to perform corrections of defective pixels with high efficiency in accordance with conditions of photography.

A second aspect of the present invention is an image capture device including: an image capture unit, which provides image data of a photographic image with a solid-state image capture component, which is equipped with a plurality of photoelectric conversion elements for photoelectrically converting light in accordance with a subject; a first memory unit, which memorizes position information of first defective pixels at the solid-state image capture component, a noise component which is included in image data corresponding to these defective pixels being larger for a longer exposure duration of the solid-state image capture component; a second memory unit, with a higher access rate than the first memory unit, which memorizes position information of second defective pixels at the solid-state image capture component, a noise component which is included in image data corresponding to these defective pixels being constant with respect to changes of the exposure duration of the solid-state image capture component; a duration information provision unit, which provides information representing the exposure duration of the solid-state image capture component; and a correction unit which corrects the image data, wherein, when the exposure duration information provided by the duration information provision unit represents an exposure duration greater than or equal to a predetermined duration, the correction unit corrects, of the image data provided by the image capture unit, image data that corresponds to defective pixels according to the position information memorized at the first memory unit and the position information memorized at the second memory unit, and when the exposure duration information provided by the duration information provision unit represents an exposure duration less than the predetermined duration, the correction unit corrects, of the image data provided by the image capture unit, image data that corresponds to defective pixels according to the position information memorized at the second memory unit.

The image capture device of the second aspect obtains image data of a photographic image with the solid-state image capture component, which is provided with the plurality of photoelectric conversion elements for photoelectric conversion of light according to a subject. The first memory unit memorizes, from among defective pixels which do not output image data accurately corresponding to light amounts of incident light at the solid-state image capture component, position information of defective pixels for which a noise component included in the image data that is outputted is larger for longer durations of exposure of the solid-state image capture component. The second memory unit is a high-speed memory, which has a higher rate of access to memorized information than the first memory unit. The second memory unit memorizes position information of defective pixels for which a noise component included in the image data that is outputted is constant for long and short durations of exposure of the solid-state image capture component, that is, unaffected by durations of exposure. The duration information provision unit acquires exposure duration information representing a duration of exposure of the solid-state image capture component. The exposure duration information is acquired by, for example, acquisition of an exposure duration specified on the basis of the image data acquired by the image capture unit, acquisition of information which represents an exposure duration for a shutter speed or the like which is inputted from outside, or the like. When the exposure duration information acquired by the duration information provision unit is exposure duration information which represents an exposure duration of less than the predetermined duration, which has been specified previously, the correction unit corrects, of the image data obtained by the image capture unit, image data corresponding to defective pixels according to the position information which is memorized at the second memory unit, which is the high-speed memory. Further, when the exposure duration information acquired by the duration information provision unit is exposure duration information which represents an exposure duration of more than the previously specified predetermined duration, the correction unit corrects, of the image data obtained by the image capture unit, image data corresponding to defective pixel position information which is memorized by either of the second memory unit, which is the high-speed memory, and the first memory unit, which is a lower-speed memory.

Thus, when the exposure duration is short, image data corresponding to position information of defective pixels which do not output image data which accurately corresponds to light amounts of incident light irrespective of whether the exposure duration is long or short, which information is stored at the second memory unit which is a high-speed memory, is corrected. When the exposure duration is long, image data according to both the position information of defective pixels memorized at the second memory unit, which is the high-speed memory, and the position information of defective pixels for which the noise component included in the outputted image data is larger for a longer exposure duration, which is memorized at the first memory unit which is a low-speed memory, is corrected.

Accordingly, because the image data according to the position information of defective pixels which are not affected by the exposure duration, which is stored at the second memory unit which is the high-speed memory, is corrected when the exposure duration is short, and the image data according to both the position information of defective pixels for which there is a greater effect of image quality deterioration when the exposure duration is longer, which is stored at the first memory unit which is the low-speed memory, and the position information of defective pixels stored at the second memory unit which is a high-speed memory is corrected when the exposure duration is long, no effect is exerted by durations of reading of information relating to defective pixels, and it is possible to carry out corrections of defective pixels with high efficiency in accordance with lengths of exposure durations, which is to say conditions of photography.

In the image capture device of the second aspect, the first memory unit compresses and stores the position information of defective pixels. When the exposure duration information that the duration information provision unit provides is exposure information representing an exposure duration of less than the predetermined duration, the correction unit corrects, of the image data provided by the image capture unit, image data which corresponds to defective pixels according to the position information memorized at the second memory unit and position information which is decompressed from the compressed position information of defective pixels, which has been memorized at the first memory unit.

The first memory unit can compress and memorize position information of defective pixels at the solid-state image capture unit. When the exposure duration information that the duration information provision unit provides is exposure information representing an exposure duration of equal to or greater than less than the pre-specified duration, the correction unit corrects, of the image data obtained by the image capture unit, image data that corresponds to defective pixels according to both the position information which is decompressed from the compressed position information memorized at the first memory unit and the non-compressed position information which is memorized at the second memory unit. Accordingly, because the position information of defective pixels of the solid-state image capture component that is stored at the second memory unit is compressed and memorized, memory capacity of the second memory unit can be assured. Further, the decompression of compressed position information is carried out only for correction processing of defective pixels at a time of acquisition with an exposure duration longer than the predetermined duration. Thus, it is possible to restrain durations required for decompression processing from affecting acquired exposure durations.

If the image capture device of the second aspect is further provided with the mode setting unit, mode information representing a photography mode can also be acquired. When the mode information set at the mode setting unit is information representing a high image quality mode which corrects the image data acquired by the image capture unit so as to produce image data with a high image quality, the correction unit can correct image data that corresponds to defective pixels according to the position information stored at both of the first memory unit and the second memory unit. As a result, when image quality is to be prioritized and mode information which represents the high image quality mode is acquired, for performing correction so as to provide high-quality image data, corresponding image data can be corrected on the basis of position information of all the defective pixels included at the solid-state image capture component. Thus, it is possible to perform correction of defective pixels with high efficiency in accordance with photography modes.

DETAILED DESCRIPTION OF THE INVENTION

Herebelow, embodiments in which the present invention is applied to digital cameras will be described with reference to the drawings.

First Embodiment

Figure 1A:
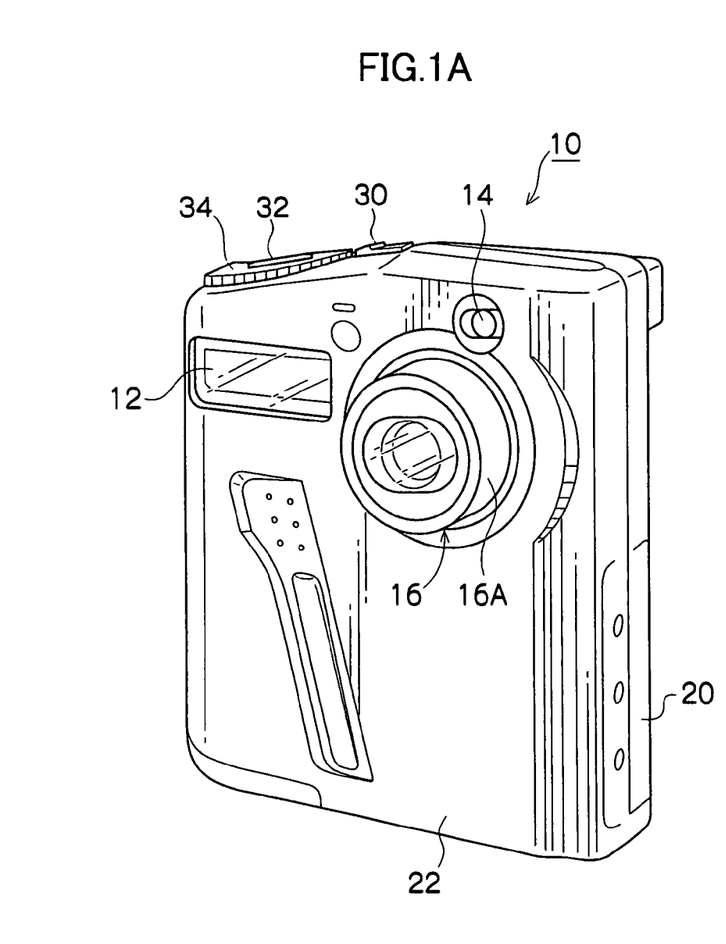
FIG. 1A is a perspective view of a digital camera relating to an embodiment of the present invention, and is a front view of the digital camera.

As shown in FIG. 1A, a flash 12, a viewfinder window 14 and an optical unit 16 are provided at a front face of a digital camera 10 which serves as an image capture device of the present invention. The flash 12 emits light when illumination is poor. Light from a subject to be photographed is incident at the viewfinder window 14. The optical unit 16 is for focusing a subject image. A slot 20 is provided at a side face of the digital camera 10. A portable recording media 18 (see FIG. 2), which records images obtained by photography as digital data, can be mounted at the slot 20.

The optical unit 16 is a retracting-type optical lens, which is retracted inside a casing 22 of a main body of the digital camera 10 except at times of photography. At times of photography, an extendable barrel 16A is extended along an optical axis and, as shown in FIG. 1A, the barrel 16A is exposed outside the casing 22. The optical unit 16 includes, inside the barrel 16A, an imaging lens 40, a focusing lens 42 and an aperture/shutter mechanism 44 (see FIG. 2). The imaging lens 40 may be a single condensing lens (for fixed focus) structured by one or a plurality of lenses, and may be a lens with which focusing distance is alterable, such as a zoom lens or a telescopic/wide-angle bifocal switching lens.

Figure 1B:
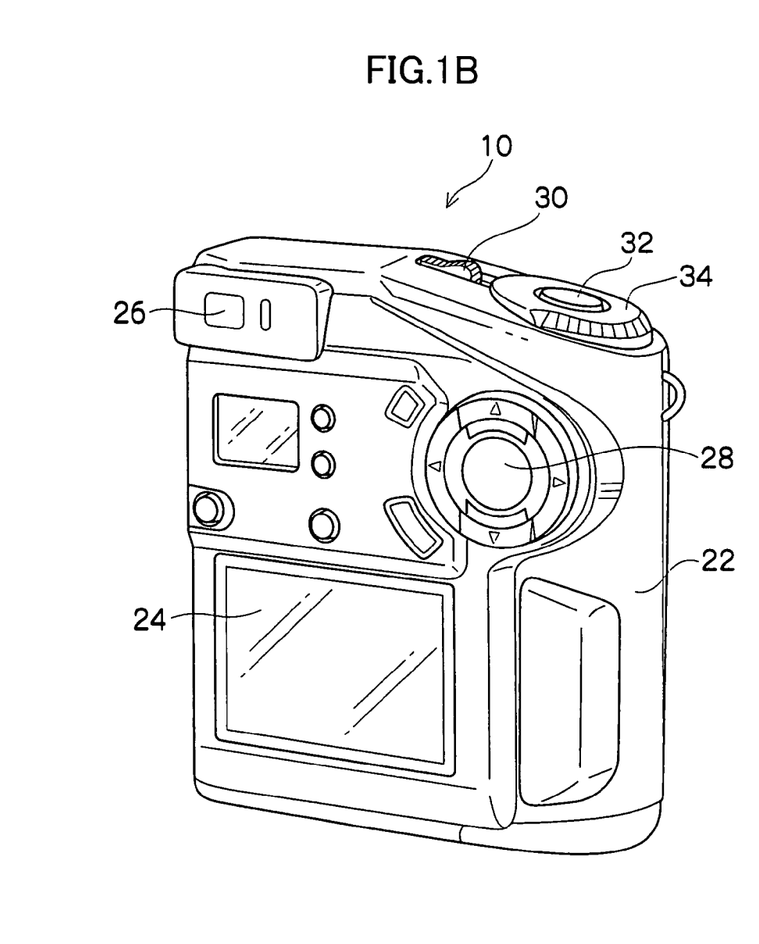
FIG. 1B is a perspective view of the digital camera relating to the embodiment of the present invention, and is a rear view of the digital camera.

Meanwhile, as shown in FIG. 1B, an LCD 24, a viewfinder eyepiece 26 and a cross-key button 28 are provided at a rear face of the digital camera 10. The LCD 24 displays subject images obtained by photography, and various menus, parameters and so forth. The viewfinder eyepiece 26 guides light that is incident on the viewfinder window 14 through an unillustrated optical member for viewing by a camera user when composition of a subject image to be photographed is being determined. The cross-key button 28 is operated by the camera user when desired menu items are being selected from menu displays, and when zoom ratio settings, various other parameters and so forth are being selected.

Further, at an upper face of the digital camera 10, a power switch 30, a release switch ("shutter button") 32 and a mode dial 34 are provided. The power switch 30 performs switching between supply and non-supply of electrical power to various parts of the digital camera 10. The release switch 32 is pressed for operation by the camera user in order to input a photography command. The mode dial 34 is turned for operation by the camera user when the camera user is selecting a photography mode. The release switch 32 is structured to be capable of a two-step pressing operation: a state which is pressed down to an intermediate position (below referred to as a half-pressed state) and a state which is pressed beyond the intermediate position to a lowermost position (below referred to as a full-pressed state). At the digital camera 10, as will be described in more detail later, an AE (automatic exposure) function operates and exposure conditions (shutter speed and aperture state) are specified when the release switch 32 is half-pressed. Thereafter, an AF (auto focus) function operates to regulate focusing, and calculation of an AWB compensation value (a standard compensation value for correcting white balance), setting of a compensation value for regulating sensitivity, which will be described later, and calculation of adjustment values for adjusting both the sensitivity and the white balance are implemented. Subsequently, exposure (photography) is performed when the release switch 32 is further pressed to the full-pressed state. Herein, setting of the shutter speed may be performed automatically as described above, and may be performed manually. As photography modes of the present embodiment, a case in which it is possible to set a still photography mode, which obtains image data of a still image when the release switch 32 is put into the full-pressed state, a continuous photography mode, which performs consecutive image capture of a designated number of images when the release switch 32 is put into the full-pressed state, and a video photography mode, which obtains image data of a moving image when the release switch 32 is put into the full-pressed state, will be described.

Figure 2:
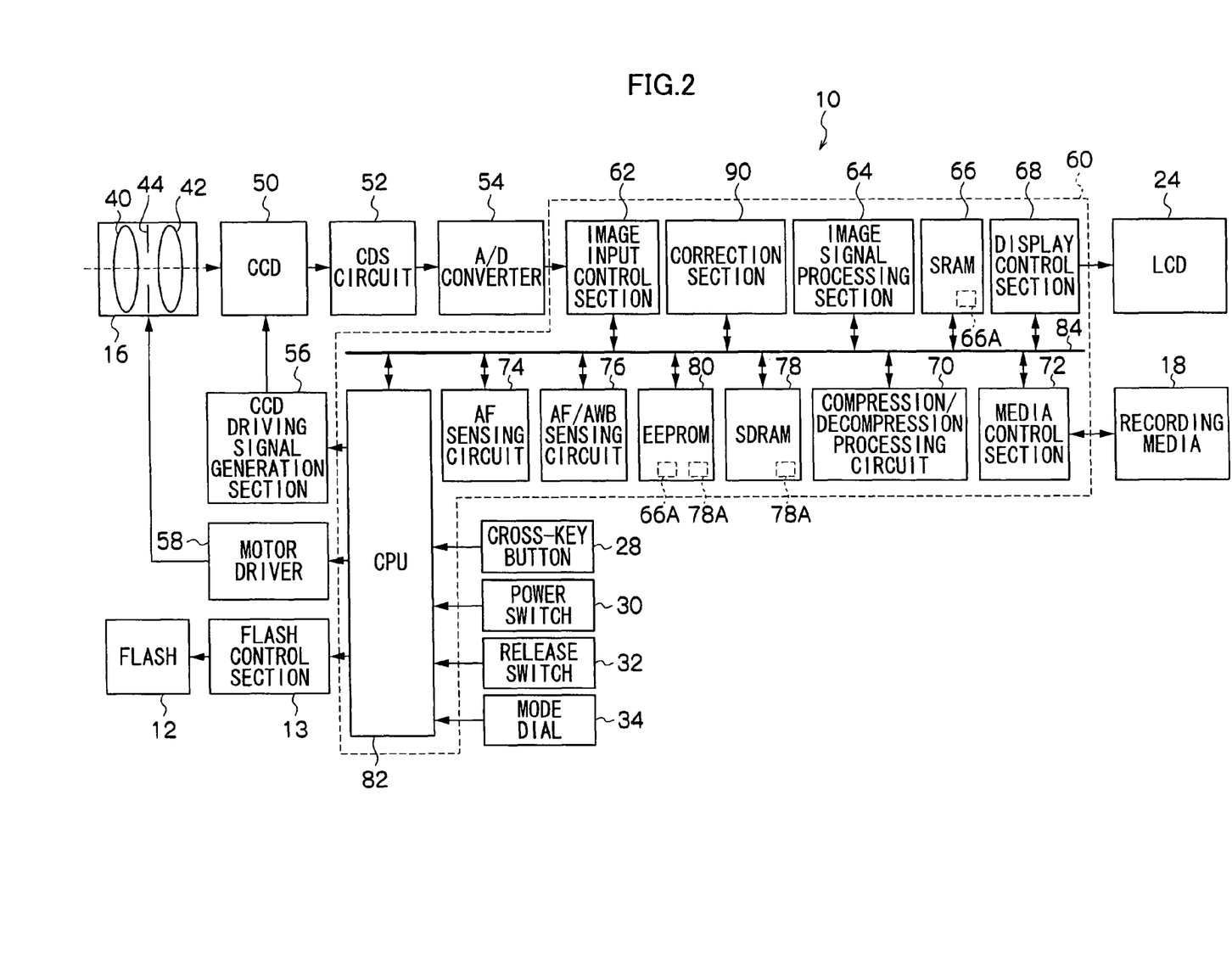
FIG. 2 is a block diagram showing structure of an electrical system of a digital camera relating to a first embodiment of the present invention.

Next, structure of an electrical system of the digital camera 10 relating to the present embodiment will be described.

As shown in FIG. 2, the digital camera 10 is equipped with a CCD (charge coupled device) 50, a CDS circuit 52, an analog-digital converter (below referred to as an A/D converter) 54, a CCD driving signal generation section 56, a motor driver 58, a flash control section 13 and a main control section 60. The CCD 50 is disposed on the optical axis of the optical unit 16. The main control section 60 administers overall operations of the digital camera 10.

The CDS circuit 52 performs correlated double sampling (CDS) processing of output signals from the CCD 50 which represent an acquired subject image, performs color separation processing to signals of each of the colors R, G and B, and adjusts a signal level of each color signal. The A/D converter 54 converts analog signals processed by the CDS circuit 52 to digital signals. The CCD driving signal generation section 56 generates timing signals for driving the CCD 50. The motor driver 58 drives each of a zoom motor for moving the imaging lens 40 included at the optical unit 16 (i.e., extending/retracting the barrel), an AF (auto focus) motor for moving the focusing lens 42, and an iris-shutter motor which drives the aperture/shutter mechanism 44. The flash control section 13 controls light emissions by the flash 12. The main control section 60 administers overall operations of the digital camera 10.

At the main control section 60, an image input control section 62, an image signal processing section 64, an SRAM 66, a display control section 68, a compression/decompression processing circuit 70, a media control section 72, an AF sensing circuit 74, an AE (auto exposure)/AWB (auto white balance) sensing circuit 76, a correction section 90, an SDRAM (synchronous dynamic random access memory) 78, an EEPROM (electrically erasable programmable read-only memory) 80 and a CPU 82 are connected to one another by a bus 84. The CPU 82 is also connected to the CCD driving signal generation section 56 and the motor driver 58. Furthermore, the CPU 82 is connected with the cross-key button 28, the power switch 30, the release switch 32 and the mode dial 34.

The digital signals which have been digitalized by the A/D converter 54 are inputted to the image input control section 62 as image data of a subject image representing the subject. A plurality of different lookup tables (below referred to as LUTs), which store information of various programs, parameters and the like, and information representing positions of defective pixels and so forth, are preparatorily stored at the EEPROM 80. As a plurality of various LUTs memorized at the EEPROM 80 for the present embodiment, a continuous defect correction LUT 66A and an isolated defect correction LUT 78A are respectively stored.

Correction information for correcting defective pixels which occur at contiguous positions on the CCD 50 is memorized in the continuous defect correction LUT 66A in the form of position information representing positions of the respective defective pixels occurring at concatenated positions. Correction information for correcting defective pixels which occur individually at separated positions on the CCD 50 is stored in the isolated defect correction LUT 78A in the form of position information representing positions of the single defective pixels.

Herein, for the present embodiment, the defective pixels corresponding to the position information memorized in the continuous defect correction LUT 66A and the isolated defect correction LUT 78A are explained as: defective pixels which are caused by dust adhering to a light incidence face of the CCD 50, at which black flaws arise due to incident light on pixels that correspond to the positions at which dust is adhered being blocked; defective pixels which are caused by damage or the like to color microfilters, microlenses and the like that are formed at the light incidence face of the pixels; and defective pixels which are caused by white flaws at which desired optical characteristics are not provided locally. These defective pixels are static defect pixels, which are not dependent on temperature, exposure duration and the like.

The SDRAM (synchronous dynamic random access memory) 78 is used as a working memory during execution of various processes by the CPU 82. The SDRAM 78 principally stores image data obtained by image capture. When the digital camera 10 is turned on, the isolated defect correction LUT 78A is extracted from the EEPROM 80 by control of the CPU 82. The SRAM (static random access memory) 66 is a high-speed memory with a faster rate of access to memorized data than an SDRAM. The continuous defect correction LUT 66A is extracted to the SRAM 66 from the EEPROM 80 by control of the CPU 82 when the digital camera 10 is turned on. In accordance with conditions of photography, the correction section 90, which will be discussed in more detail later, performs defective pixel correction on, of the image data that is inputted from the A/D converter 54 via the image input control section 62, image data that corresponds to the position information of defective pixels that is memorized in one or both of the continuous defect correction LUT 66A and the isolated defect correction LUT 78A (as will be described in more detail later). The image signal processing section 64 performs predetermined digital signal processing on the image data that has been subjected to defective pixel correction. The display control section 68 controls display by the LCD 24 so as to display an image based on image data stored in the SRAM 66. The compression/decompression processing circuit 70 compresses/expands inputted image data. The media control section 72 writes various kinds of information to the recording media 18 mounted at the slot 20. The AF sensing circuit 74 detects a suitable focusing position on the basis of inputted image data. The AE/AWB sensing circuit 76 adjusts for suitable exposure and white balance on the basis of inputted image data.

Generally, a shutter drain connected via a shutter gate is provided at the CCD 50, and accumulated signal charge can be released to the shutter drain when the shutter gate is driven by a shutter gate pulse. That is, the CCD 50 features an "electronic shutter" function, which controls an accumulation duration for which charge is accumulated at the photoelectric conversion elements (a shutter speed) with the shutter gate pulse. The CCD 50 may employ this electronic shutter function in place of a shutter function of the aperture/shutter mechanism 44.

Herein, the SRAM 66 corresponds to a second memory unit of an image capture device of the present invention, the SDRAM 78 corresponds to a first memory unit of the present invention, and the correction section 90 corresponds to a correction unit of the image capture device of the present invention.

Next, operations of the digital camera 10 relating to the embodiment described above will be described.

Figure 3:
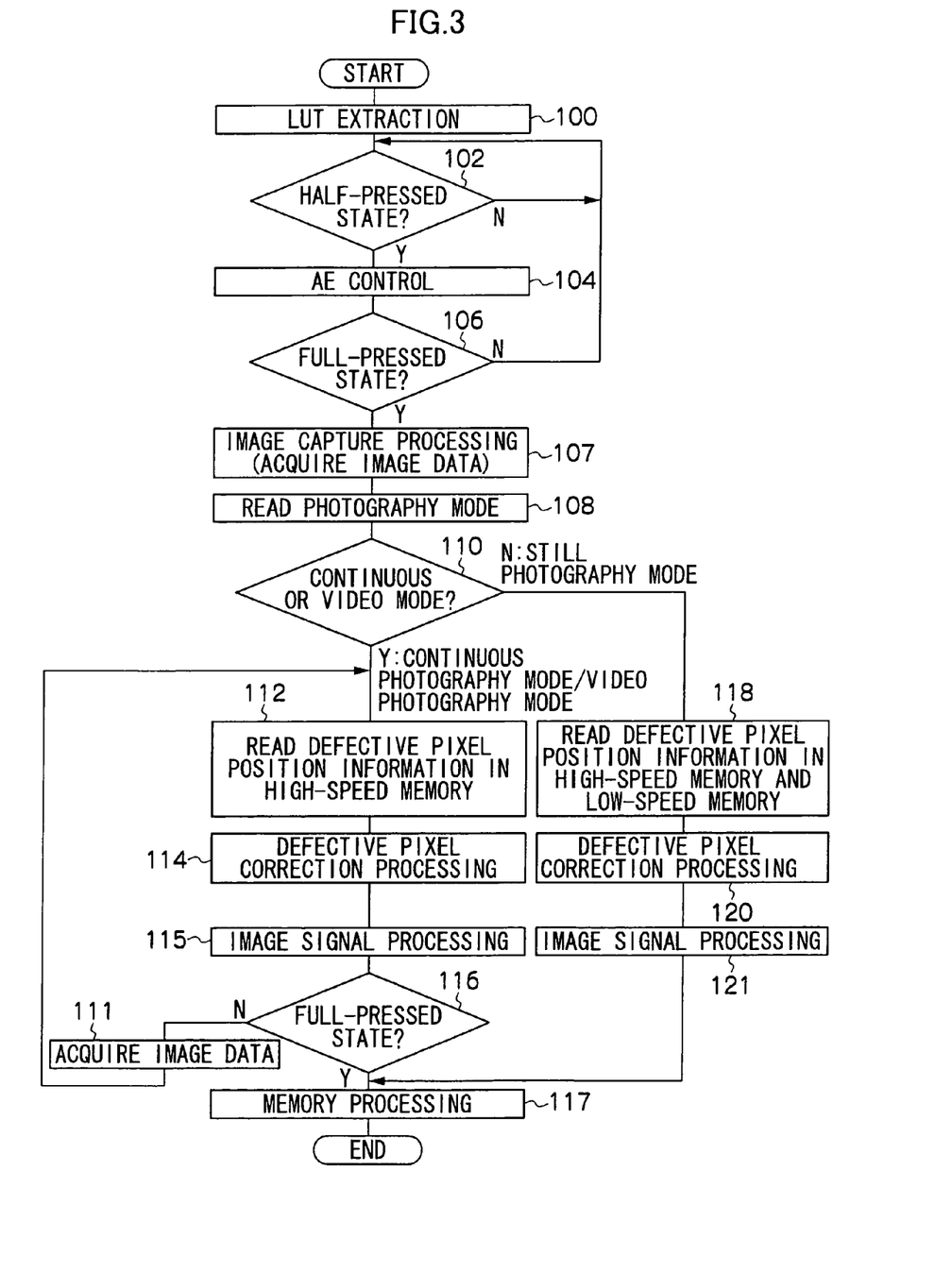
FIG. 3 is a flowchart showing a processing routine which is executed by a CPU of the digital camera relating to the first embodiment of the present invention.

FIG. 3 shows a processing routine which is executed by the CPU 82. When power to the digital camera 10 is turned on by the power switch 30, the sequence proceeds to step 100, the continuous defect correction LUT 66A memorized at the EEPROM 80 is extracted to the SRAM 66, which is a high-speed memory, and the isolated defect correction LUT 78A is extracted to the SDRAM 78, which is a lower-speed memory than the SRAM 66.

Next, in step 102, a negative judgement is repeated until it is judged that the release switch 32 is in the half-pressed state. When the judgement is positive, the sequence advances to step 104. In step 104, a subject brightness (a photographic EV value) is found on the basis of an aggregated value aggregated from the R, G and B signals for one frame of a subject image. On the basis of this photographic EV, AE control is performed to set an aperture value and a shutter speed, which serve as exposure control values.

Next, in step 106, it is determined whether or not the release switch 32 is fully pressed. When this judgment is negative, the sequence returns to step 102, and when the judgment is positive, the sequence advances to step 107.

In step 107, a state of the aperture/shutter mechanism 44 is controlled in accordance with the aperture condition set in step 104. Then, image capture processing is executed, in which an accumulation duration for charge to be accumulated at the photoelectric conversion elements corresponding to the pixels of the CCD 50 is controlled by the electronic shutter function of the CCD 50 so as to match the shutter speed set in step 104, and charge that is transferred from the photoelectric conversion elements is sequentially outputted from the CCD 50, then converted to digital data by the A/D converter 54 and inputted to the main control section 60 to serve as image data of a photographic image according to image data for each pixel. Herein, the processing of step 107 corresponds to the functioning of an image capture unit of the image capture device of the present invention.

In step 108, photography mode acquisition processing is executed. The processing of step 108 can be performed by reading, from an unillustrated memory, information which represents a photography mode that has been specified by manipulation of the mode dial 34 by a user. This information representing the photography mode may be memorized in the unillustrated memory when the mode dial 34 is operated by the user. Herein, the processing of step 108 corresponds to the functioning of a mode setting unit of the image capture device of the present invention.

Next, in step 110, it is determined whether or not the information representing the photography mode that has been read in step 108 is mode information representing the continuous photography mode or the video photography mode. If this judgement is positive, the sequence proceeds to step 112, and the position information representing positions of defective pixels that is stored in the continuous defect correction LUT 66A memorized at the SRAM 66, which is the high-speed memory, is read in.

In a subsequent step 114, on the basis of the position information representing positions of defective pixels, which has been read in the above-described step 112 and stored in the continuous defect correction LUT 66A that has been memorized at the SRAM 66 which is the high-speed memory, processing for correction of defective pixels of the photographic image image data (i.e., the image data of the captured image) acquired in step 107 is executed. The defective pixel correction processing is carried out by, for example, setting image data corresponding to a defective pixel in the photographic image image data, which features a defect, to an average value of charges of pixels neighboring the defective pixel. Herein, the defective pixel correction processing may be carried out by applying addition/subtraction/division/multiplication of pre-specified correction values to image data corresponding to defective pixels in the image data of the captured image, but is not limited to such forms.

Next, in step 115, the photographic image image data which has been subjected to defective pixel correction processing is subjected to image processing for implementing the predetermined digital signal processing, after which the image-processed image data is memorized at the SDRAM 78.

Next, in step 116, it is determined whether or not the release switch 32 is in the full-pressed state. If this judgement is negative, the sequence proceeds to step 111, processing similar to the above-described step 107 is performed and image data is acquired, after which the sequence returns to step 112. When the judgement is positive, the sequence proceeds to step 117.

Here, if it was determined in step 110 that the mode information represents the continuous photography mode, instead of the judgement of step 116, it may be determined whether or not a predetermined number, which is specified in advance, of frames of image data have been acquired. If this judgement is negative, a count value of an unillustrated counter is incremented, after which the sequence proceeds to step 111. If the judgement is positive, the unillustrated counter is reset, and then the sequence proceeds to step 117.

In step 117, the photographic image image data which has been subjected to the defective pixel correction processing and various other image processes is processed for compression/decompression, after which memory processing for memorizing the image data at the recording media 18 is executed. Subsequently, the present routine ends.

On the other hand, if the judgement in step 110 is negative, with the photography mode read in step 108 being the still photography mode, the sequence proceeds to step 118 and reads in both the position information representing positions of defective pixels which is stored in the continuous defect correction LUT 66A memorized at the SRAM 66, which is the high-speed memory, and the position information representing positions of defective pixels which is stored in the isolated defect correction LUT 78A memorized at the SDRAM 78, which is the low-speed memory.

Next, in step 120, in a similar manner to the processing of the above-described step 114, of the image data obtained in step 107, defective pixel correction processing is carried out on image data that corresponds to position information of defective pixels, on the basis of the position information of defective pixels stored in the continuous defect correction LUT 66A and the isolated defect correction LUT 78A.

Next, in step 121, in a similar manner to the above-described step 115, image processing is performed to implement predetermined digital signal processing on the photographic image image data which has been subjected to the defective pixel correction processing, after which the sequence proceeds to the aforementioned step 117.

Herein, the processing of steps 114 and 120 corresponds to functioning of the correction unit of the present invention.

As has been described above, in the digital camera 10 of the present embodiment, when the continuous photography mode or the video photography mode is set, which modes require higher-speed processing of image data in which speed is prioritized over image quality than the still photography mode which provides image data of still images, the defective pixel correction processing is carried out on, of the image data of a photographic image, image data that corresponds to respective defective pixels which occur at contiguous positions, according to the defective pixel position information that is stored in the continuous defect correction LUT 66A memorized at the SRAM 66, which is the high-speed memory.

Further, when the still photography mode is set, which requires acquisition of higher-image quality image data than the continuous photography mode and the video photography mode, correction is applied to, of image data of a photographic image, image data that corresponds to position information of all defective pixels of the CCD 50, according to both the defective pixel position information that is stored in the isolated defect correction LUT 78A memorized at the SDRAM 78, which is a lower-speed memory than the SRAM 66, and the defective pixel position information that is stored in the continuous defect correction LUT 66A memorized at the SRAM 66, which is the high-speed memory.

Therefore, when the continuous photography mode or the video photography mode is specified, because only the continuous defect correction LUT 66A which has been extracted to the SRAM 66, which is the high-speed memory, is read, a duration of reading of information relating to defective pixels can be restrained from becoming a problem. In addition, because it is possible to correct image data corresponding to defective pixels that occur at continuous positions, it is possible to correct image data corresponding to position information which represents the continuous defective pixels, which have a greater effect on image quality.

Moreover, at times of the still photography mode which obtains image data of still images, which have higher requirements for acquisition of high-quality image data, on the basis of position information representing defective pixels stored at both the continuous defect correction LUT 66A and the isolated defect correction LUT 78A, which is to say all defective pixels of the CCD 50, it is possible to perform the defective pixel correction processing on corresponding image data.

Accordingly, it is possible to restrain a duration of reading of information relating to defective pixels from becoming a problem, and it is possible to perform correction of defective pixels with high efficiency in accordance with conditions of photography.

Now, for the present embodiment, a case has been described in which both the continuous defect correction LUT 66A and the isolated defect correction LUT 78A are memorized at the EEPROM 80 without compression processing or the like being performed, and are extracted to the SRAM 66 and the SDRAM 78, respectively, when power of the digital camera 10 is turned on. However, it is also possible to compress the isolated defect correction LUT 78A and memorize the isolated defect correction LUT 78A at the EEPROM 80 beforehand and, when the power of the digital camera 10 is turned on, to extract the isolated defect correction LUT 78A to the SDRAM 78 in the compressed state. In this case, when the defective pixel position information is being read in the above-mentioned step 118, the compressed isolated defect correction LUT 78A that has been memorized in the SDRAM 78, which is the low-speed memory, may be decompressed and the defective pixel position information thereof subsequently read in. In such a case, it is possible to avoid memory shortages at the EEPROM 80 due to the isolated defect correction LUT 78A. Furthermore, the compressed isolated defect correction LUT 78A is not used when the continuous photography mode and video photography mode requiring rapid image processing are set, but is decompressed for use only when the ordinary still photography mode is set, which, in comparison with the continuous photography mode and the video photography mode, does not require high-speed processing. Therefore, a duration required for decompression processing of the isolated defect correction LUT 78A can be restrained from having any effect on speeds of processing of image data in the digital camera 10.

Second Embodiment

For the first embodiment described above, a case has been described of performing pixel correction of defective pixels which have static characteristics, at which generated noise components are substantially constant irrespective of the length of a duration of exposure. For the present embodiment however, a case will be described of performing correction on both defective pixels which have dynamic characteristics, such as thermal white flaws and the like at which the amount of a noise component which is generated by a defective pixel increases as an exposure duration becomes longer, and defective pixels having static characteristics, as have been discussed for the above-described first embodiment.

Figure 4:
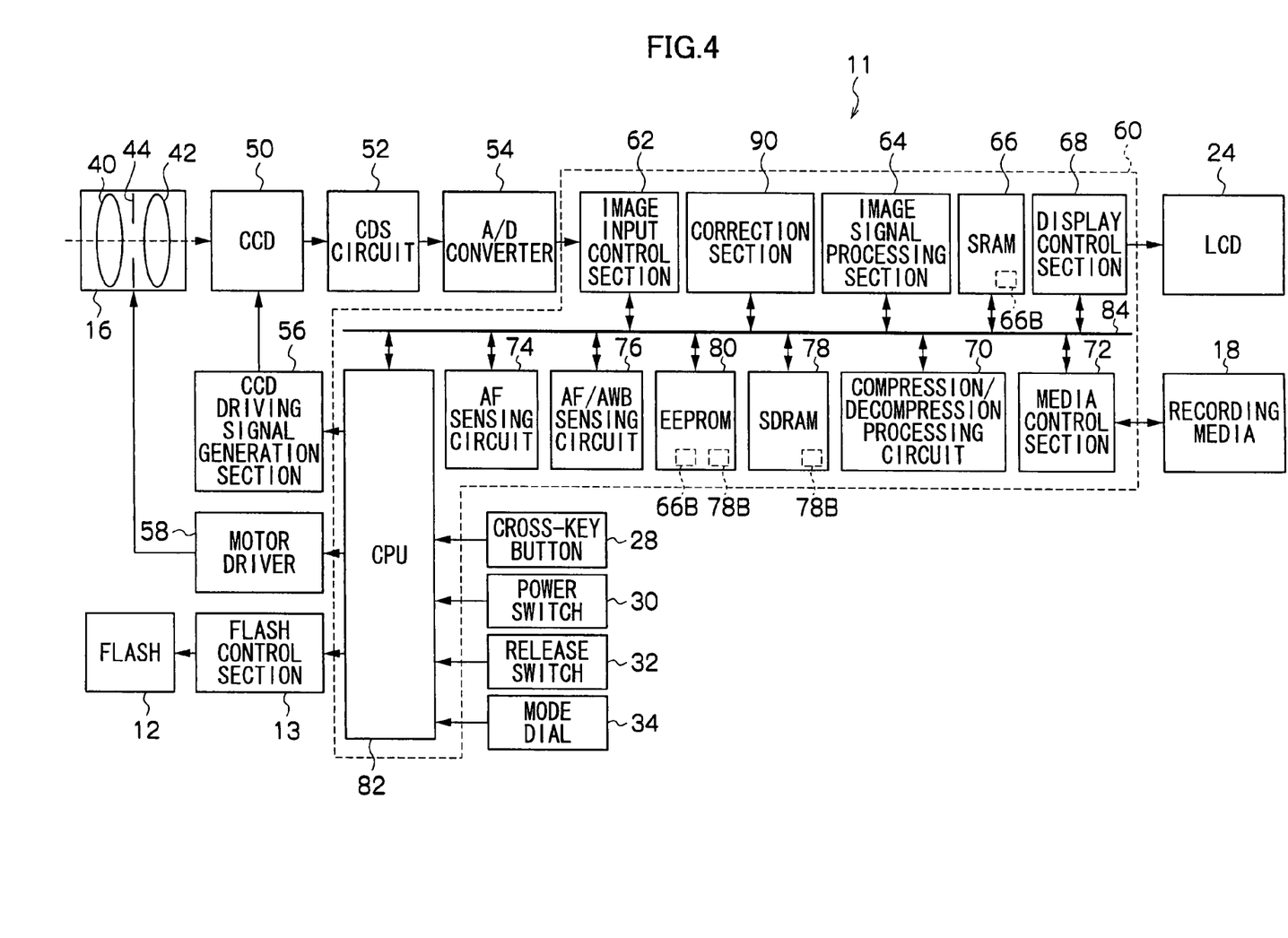
FIG. 4 is a block diagram showing structure of an electrical system of a digital camera relating to a second embodiment of the present invention.

Furthermore, for the first embodiment described above, respective memorization of the continuous defect correction LUT 66A and the isolated defect correction LUT 78A as a plurality of LUTs at the EEPROM 80 has been described. For the present embodiment however, prior memorization of a usual correction LUT 66B and a long-exposure correction LUT 78B, as shown in FIG. 4A, will be described.

In the usual correction LUT 66B, correction information for correcting, of defective pixels that have arisen at the CCD 50, defective pixels for which generated amounts of noise components caused by the defective pixels are at levels capable of causing image deterioration even at short exposures, of less than a predetermined duration, is memorized as position information representing positions of those defective pixels. In the long-exposure correction LUT 78B, correction information for correcting defective pixels for which generated amounts of noise components are larger for longer exposure durations is memorized as position information representing positions of these defective pixels.

Next, operations of a digital camera 11 relating to the present embodiment will be described.

Figure 5:
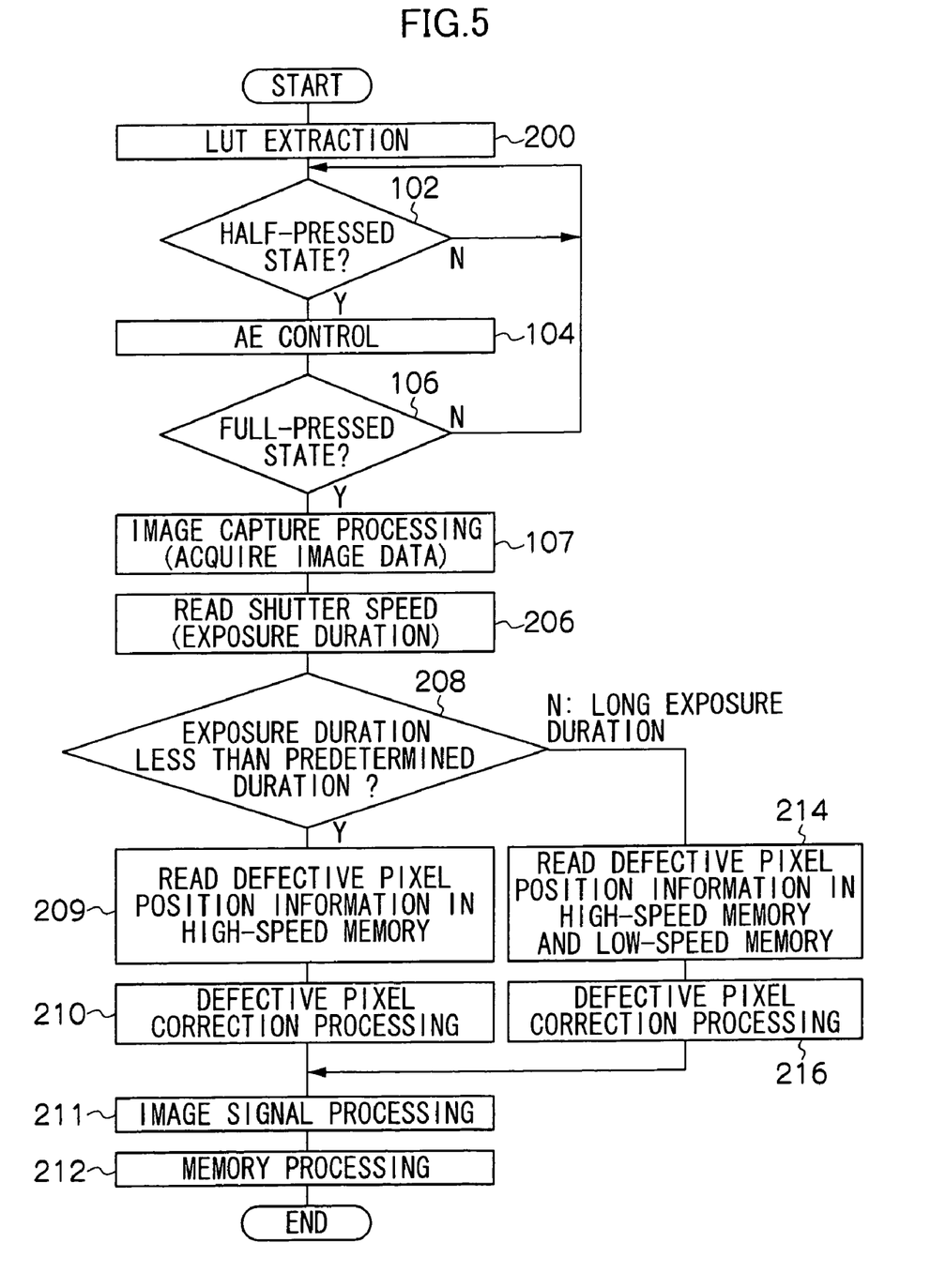
FIG. 5 is a flowchart showing a processing routine which is executed by a CPU of the digital camera relating to the second embodiment of the present invention.

FIG. 5 shows a processing routine which is executed by the CPU 82. When power to the digital camera 11 is turned on by the power switch 30, the sequence proceeds to step 200, the usual correction LUT 66B memorized at the EEPROM 80 is extracted to the SRAM 66, which is a high-speed memory, and the long-exposure correction LUT 78B is extracted to the SDRAM 78, which is a lower-speed memory than the SRAM 66.

Then, the processing from step 102 to step 107 is executed in a similar manner to the first embodiment described above. After the aperture value and shutter speed have been set to serve as exposure control values, image capture processing is executed, in which an accumulation duration for charge to be accumulated at the photoelectric conversion elements corresponding to the pixels of the CCD 50 is controlled by the electronic shutter function of the CCD 50 so as to match the shutter speed set in step 104, and charge that is transferred from the photoelectric conversion elements is sequentially outputted from the CCD 50, then converted to digital data by the A/D converter 54 and inputted to the main control section 60 to serve as image data. Thus, image data of a photographic image is obtained.

Next, in step 206, an exposure duration according to the shutter speed set by the processing of step 104 is read in. Here, the exposure duration may be set by instructive operation of the mode dial 34 by a user, and a thus-specified value can be read in.

Next, in step 208, it is determined whether or not the exposure duration corresponding to the shutter speed specified in step 104 is less than a predetermined duration, which has been specified beforehand. If the judgement is positive, the sequence proceeds to step 209. The previously specified predetermined duration represents a threshold value of exposure duration at which, at the defective pixels stored in the long-exposure correction LUT 78B, a generated value of a noise component, which increases as the exposure duration becomes longer, reaches a level which can affect image quality.

Next, in step 209, the position information representing positions of defective pixels that is stored in the usual correction LUT 66B memorized at the SRAM 66, which is the high-speed memory, is read in.

In a subsequent step 210, defective pixel correction processing of the photographic image image data acquired in step 107 is executed in a similar manner to the aforementioned step 114, on the basis of the position information representing positions of defective pixels that has been stored in the usual correction LUT 66B memorized at the SRAM 66, which is the high-speed memory, which information was read in in step 209.

Next, in step 211, the photographic image image data which has been subjected to defective pixel correction processing is subjected to image processing for implementing predetermined digital signal processing. Then, in a subsequent step 212, the photographic image image data which has been subjected to the defective pixel correction processing and the predetermined image signal processing is subjected to various image processes, and memory processing is executed to memorize the image data at the recording media 18. Subsequently, the present routine ends.

On the other hand, if the judgement in step 208 is negative, with the exposure duration corresponding to the shutter speed that was read in step 206 being greater than or equal to the predetermined duration, the sequence proceeds to step 214 and reads in both the position information representing positions of defective pixels which is stored in the usual correction LUT 66B memorized at the SRAM 66, which is the high-speed memory, and the position information representing positions of defective pixels which is stored in the long-exposure correction LUT 78B memorized at the SDRAM 78, which is the low-speed memory.

Then, in step 216, in a similar manner to the processing of the above-described step 214, of the image data obtained in step 107, defective pixel correction processing is carried out on image data that corresponds to position information of defective pixels, on the basis of the position information of defective pixels stored in the usual correction LUT 66B and long-exposure correction LUT 78B which were read in in step 214. Then, the sequence proceeds to step 211.

Here, the processing of steps 210 and 216 corresponds to functioning of the correction unit of the image capture device of the present invention.

As has been described above, in the digital camera 11 of the present embodiment, when a specified exposure duration is greater than or equal to the predetermined duration, which is a threshold value of exposure duration at which generated amounts of noise components due to defective pixels which are dynamic defect factors—at which generated amounts of noise components due to the defective pixels increase as the exposure duration gets longer—reach a level which would affect image quality, the defective pixel correction processing is carried out on the basis of both the defective pixel position information that is stored in the long-exposure correction LUT 78B stored at the SDRAM 78, which is a low-speed memory, and the defective pixel position information that is stored in the usual correction LUT 66B memorized at the SRAM 66, which is the high-speed memory. When the specified exposure duration is shorter than the predetermined duration, the defective pixel correction processing is carried out on the basis of the defective pixel position information that is stored in the usual correction LUT 66B stored at the SRAM 66, which is the high-speed memory.

Thus, when an exposure duration is short, the defective pixel correction processing is executed in accordance with the position information of defective pixels that is stored at the usual correction LUT 66B, which is stored at the SRAM 66 which is the high-speed memory, and when an exposure duration is long, the defective pixel correction processing is carried out in accordance with the pixel information of defective pixels that is stored at the long-exposure correction LUT 78B, which is stored at the SDRAM 78 which is the low-speed memory. Therefore, a duration of reading of information relating to defective pixels can be restrained from becoming a problem. In addition, it is possible to perform correction processing of defective pixels in accordance with conditions of photography.

Moreover, it is possible to carry out corrections of defective pixels without causing reductions in processing speeds but with high efficiency in accordance with conditions of photography.

Now, for the present embodiment, a case has been described in which both the usual correction LUT 66B and the long-exposure correction LUT 78B are memorized at the EEPROM 80 without compression processing or the like being performed, and are extracted to the SRAM 66 and the SDRAM 78, respectively, when power of the digital camera 11 is turned on. However, it is also possible to compress the long-exposure correction LUT 78B and memorize the long-exposure correction LUT 78B at the EEPROM 80 beforehand and, when the power of the digital camera 11 is turned on, to extract the long-exposure correction LUT 78B to the SDRAM 78 in the compressed state. In this case, when the judgement in the above-mentioned step 208 is negative and the defective pixel position information is being read in step 214, the compressed long-exposure correction LUT 78B that has been memorized in the SDRAM 78, which is the low-speed memory, may be decompressed and the defective pixel position information thereof subsequently read in. In such a case, it is possible to avoid memory shortages at the EEPROM 80 due to the long-exposure correction LUT 78B. Furthermore, the compressed long-exposure correction LUT 78B is not used at times of usual photography for which exposure durations are short, but is decompressed only when it is determined that the photography has a long exposure duration, which exposure duration is longer than the predetermined duration. Thus, processing for decompression of the long-exposure correction LUT 78B can be restrained from having any effect on speeds of other image data processes at times of image capture.

Further, for the present embodiment, a case has been described in which the exposure duration is automatically specified as a duration according to a shutter speed which is set by AE control, which is executed when the release switch 32 is half-pressed. However, it is also possible to set the exposure duration from setting of the mode dial 34 by a user. In such a case, in the processing of step 206, it is sufficient for the exposure duration to be read in by reading a shutter speed value that has been set at the mode dial 34.

Further, for the present embodiment, a case has been described in which it is determined whether or not a specified exposure duration is less than the predetermined duration in the determination of step 208. If the exposure duration is less than the predetermined duration, defective pixel correction processing is carried out in accordance with the pixel information of defective pixels that is stored at the usual correction LUT 66B, which is stored at the SRAM 66 which is the high-speed memory, and if the exposure duration is more than the predetermined duration, the defective pixel correction processing is carried out in accordance with the pixel information of defective pixels that is stored at the long-exposure correction LUT 78B, which is stored at the SDRAM 78 which is the low-speed memory. However, it is also possible to further provide an image quality priority mode as one of photography modes of the digital camera 11 beforehand, which mode, when the various signal processes are performed, performs signal processing on the image data which has been subjected to defective pixel correction processing so as to produce image data of a higher image quality. When this image quality priority mode is specified, the sequence proceeds from step 208 to step 214, and when a mode other than the image quality priority mode is specified, the sequence proceeds to step 209. In a case in which this further signal processing for producing image data with higher image quality is performed on the defective pixel correction-processed image data, it can be expected that a longer time will be required for signal processing in step 211 than in a case in which the signal processing for producing image data with higher image quality is not performed. Therefore, when in the image quality priority mode, it is possible, by employing the usual correction LUT 66B and the long-exposure correction LUT 78B which are memorized at the high-speed memory and the low-speed memory, respectively, to carry out defective pixel correction processing with image quality prioritized over speed.

What is claimed is:

1. An image capture device comprising:
    an image capture unit including a solid-state image capture component, which is equipped with a plurality of photoelectric conversion elements for photoelectrically converting light in accordance with a subject, the image capture unit providing image data of a photographic image of the subject via the solid-state image capture component;
    a first memory unit, which memorizes position information of each of non-contiguous defective pixels at the solid-state image capture component;
    a second memory unit, which has a higher access rate when being accessed than the first memory unit has when being accessed, and which memorizes position information of each of contiguous defective pixels at the solid-state image capture component;
    a mode setting unit, at which mode information representing a photography mode is set; and
    a correction unit which corrects the image data, the correction unit selectively determining, based on the photography mode, whether to access the first memory unit and to correct the non-contiguous defective pixels, or to not access the first memory unit and to not correct the non-contiguous defective pixels, wherein, when the mode information set at the mode setting unit represents one of a continuous photography mode for providing image data of a series of photographic images or a video photography mode for providing image data of a moving image, the correction unit corrects, of the image data provided by the image capture unit, image data that corresponds to contiguous defective pixels according to the position information memorized at the second memory unit, and the correction unit does not correct image data that corresponds to non-contiguous defective pixels, and when the mode information set at the mode setting unit represents a still photography mode for providing image data of a still image, the correction unit corrects, of the image data provided by the image capture unit, image data that corresponds to contiguous and non-contiguous defective pixels according to the position information memorized at the second memory unit and the position information memorized at the first memory unit.

2. The image capture device of claim 1, wherein the position information of non-contiguous defective pixels is compressed for memorization at the first memory unit, and, when the mode information represents the still photography mode, the correction unit corrects, of the image data provided by the image capture unit, image data that corresponds to defective pixels according to the position information memorized at the second memory unit and position information which is decompressed from the compressed defective pixel position information which has been memorized at the first memory unit.

3. The image capture device of claim 1, wherein the correction by the correction unit of image data that corresponds to defective pixels includes interpolating the image data that corresponds to the defective pixels from image data of pixels around the defective pixels.

4. An image capture device which is settable to at least two different photography modes, the image capture device comprising:

an image capture unit including a solid-state image capture component which is equipped with a plurality of photoelectric conversion elements, the image capture unit generating image data via the solid-state image capture component;

a first memory unit, which memorizes position information of each of non-contiguous defective pixels at the solid-state image capture component;

a second memory unit, which has a higher access rate when being accessed than the first memory unit has when being accessed, and which memorizes position information of each of contiguous defective pixels at the solid-state image capture component; and a correction unit which corrects the image data, the correction unit selectively determining, based on a photography mode, whether to access the first memory unit and to correct the non-contiguous defective pixels, or to not access the first memory unit and to not correct the non-contiguous defective pixels, wherein, when the photography mode is a continuous photography mode for providing image data of a series of photographic images or a video photography mode for providing image data of a moving image, the correction unit corrects image data corresponding to contiguous defective pixels on the basis of the position information of defective pixels memorized at the second memory unit, and the correction unit does not correct image data corresponding to non-contiguous defective pixels, and when the photography mode is a still photography mode for providing image data of a still image, the correction unit corrects the image data corresponding to contiguous and non-contiguous defective pixels on the basis of the position information memorized at the second memory unit and the position information memorized at the first memory unit.

5. The image capture device of claim 4, wherein the position information of non-contiguous defective pixels is compressed for memorization at the first memory unit, and, when the photography mode is the still photography mode, the correction unit decompresses the compressed position information of defective pixels for correcting the image data.

6. The image capture device of claim 4, wherein the correction by the correction unit of image data that corresponds to defective pixels includes interpolating the image data that corresponds to the defective pixels from image data of pixels around the defective pixels.

7. An image data correction process for an image capture device which includes a solid-state image capture component and is provided with at least two different photography modes, the process comprising the steps of:

memorizing, at a first memory unit, position information of each of non-contiguous defective pixels at the solid-state image capture component;

memorizing, at a second memory unit, which has a higher access rate when being accessed than the first memory unit has when being accessed, position information of each of contiguous defective pixels at the solid-state image capture component;

generating image data via the solid-state image capture component;

selectively determining, based on a photography mode, whether to access the first memory unit and to correct the non-contiguous defective pixels, or to not access the first memory unit and to not correct the non-contiguous defective pixels; and correcting the image data, including when the photography mode is a continuous photography mode for providing image data of a series of photographic images or a video photography mode for providing image data of a moving image, correcting image data corresponding to contiguous defective pixels on the basis of the position information of defective pixels memorized at the second memory unit, and not correcting image data corresponding to non-contiguous defective pixels, and when the photography mode is a still photography mode for providing image data of a still image, correcting the image data corresponding to contiguous and non-contiguous defective pixels on the basis of the position information memorized at the second memory unit and the position information memorized at the first memory unit.

8. An image capture device comprising:

an image capture unit including a solid-state image capture component, which is equipped with a plurality of photoelectric conversion elements for photoelectrically converting light in accordance with a subject, the image capture unit providing image data of a photographic image of the subject via the solid-state image capture component;

a first memory unit, which memorizes position information of each of non-contiguous defective pixels at the solid-state image capture component;

a second memory unit, which has a higher access rate when being accessed than the first memory unit has when being accessed, and which memorizes position information of each of contiguous defective pixels at the solid-state image capture component;

a mode setting unit, at which mode information representing a photography mode is set; and a correction unit which corrects the image data, the correction unit selectively determining, based on the photography mode, whether to access the first memory unit and to correct the non-contiguous defective pixels, or to not access the first memory unit and to not correct the non-contiguous defective pixels, wherein, when the mode information set at the mode setting unit represents a continuous photography mode for providing image data of a series of photographic images or a video photography mode for providing image data of a moving image, the correction unit corrects, of the image data provided by the image capture unit, image data that corresponds to contiguous defective pixels according to the position information memorized at the second memory unit, and does not correct image data corresponding to non-contiguous defective pixels, the correction of the image data that corresponds to contiguous defective pixels by the correction unit being conducted without using the position information memorized at the first memory unit, and when the mode information set at the mode setting unit represents a still photography mode for providing image data of a still image, the correction unit corrects, of the image data provided by the image capture unit, image data that corresponds to contiguous and non-contiguous defective pixels according to the position information memorized at the second memory unit and the position information memorized at the first memory unit.

9. An image capture device comprising:

an image capture unit including a solid-state image capture component, which is equipped with a plurality of photoelectric conversion elements for photoelectrically converting light in accordance with a subject, the image capture unit providing image data of a photographic image of the subject via the solid-state image capture component;

an image data memory to store the image data and to initially store position information related to defective pixels at the solid-state image capture component, wherein the memory is adapted to:
  (i) send position information related to each non-contiguous defective pixel at the solid-state image capture component to a first memory device, which stores the position information of each of the non-contiguous defective pixels; and
  (ii) send position information related to each contiguous defective pixel at the solid-state image capture component to a second memory device, which stores the position information of each of the contiguous defective pixels;

a mode setting unit, at which mode information representing a photography mode is set; and a correction unit which corrects the image data, the correction unit selectively determining, based on the photography mode, whether to access the first memory device and to correct the non-contiguous defective pixels, or to not access the first memory device and to not correct the non-contiguous defective pixels, wherein, when the mode information set at the mode setting unit represents a continuous photography mode for providing image data of a series of photographic images or a video photography mode for providing image data of a moving image, the correction unit corrects, of the image data provided by the image capture unit, image data that corresponds to defective pixels according to the position information memorized at the second memory device and not image data that corresponds to defective pixels according to the position information memorized at the first memory device, and when the mode information set at the mode setting unit represents a still photography mode for providing image data of a still image, the correction unit corrects, of the image data provided by the image capture unit, image data that corresponds to defective pixels according to the position information memorized at the second memory device and the position information memorized at the first memory device.

* * * * *